United States Patent
Mori et al.

(10) Patent No.: US 8,836,734 B2
(45) Date of Patent: Sep. 16, 2014

(54) DISPLAY BURN-IN PREVENTION DEVICE AND METHOD WITH MOTION ANALYSIS

(75) Inventors: Hideto Mori, Tokyo (JP); Hiroshi Imamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 644 days.

(21) Appl. No.: 13/132,755

(22) PCT Filed: Dec. 10, 2009

(86) PCT No.: PCT/JP2009/070675
§ 371 (c)(1),
(2), (4) Date: Aug. 24, 2011

(87) PCT Pub. No.: WO2010/067839
PCT Pub. Date: Jun. 17, 2010

(65) Prior Publication Data
US 2011/0298818 A1    Dec. 8, 2011

(30) Foreign Application Priority Data

Dec. 11, 2008   (JP) ................................. 2008-316294

(51) Int. Cl.
G09G 5/10       (2006.01)
H04N 3/20       (2006.01)
G09G 3/32       (2006.01)
H04N 5/14       (2006.01)

(52) U.S. Cl.
CPC ...... G09G 3/3208 (2013.01); *G09G 2320/0271* (2013.01); *G09G 2360/16* (2013.01); *G09G 2320/046* (2013.01); *H04N 5/144* (2013.01); *G09G 2320/0613* (2013.01); *G09G 2320/066* (2013.01); *G09G 2320/106* (2013.01)
USPC .......................................... 345/690; 348/173

(58) Field of Classification Search
CPC .................................. G06K 9/00711–9/00765
See application file for complete search history.

(56) References Cited

U.S. PATENT DOCUMENTS

2003/0210256 A1 * 11/2003 Mori et al. .................... 345/690
2004/0201583 A1    10/2004 Burroughes et al.
(Continued)

FOREIGN PATENT DOCUMENTS

JP    2000 330542    11/2000
JP    2002 116736    4/2002
(Continued)

OTHER PUBLICATIONS

Office Action issued Dec. 4, 2012 in Japanese Patent Application No. 2008-316294.
(Continued)

*Primary Examiner* — Carlos Perromat
(74) *Attorney, Agent, or Firm* — Oblon, Spivak, McClelland, Maier & Neustadt, L.L.P.

(57) ABSTRACT

Provided is a display device including a video signal analysis block (110) for analyzing a video signal and determining a type of video from an analysis result, a function control block (120) for controlling a gain value of the video signal according to the type of video, a video signal control section (122) for adjusting the video signal on the basis of the gain controlled by the function control block, and a display panel (300), having a plurality of pixels arranged to self-emit light according to the video signal, for displaying a video on the basis of the video signal adjusted by the video signal control section (122).

11 Claims, 8 Drawing Sheets

(56) References Cited

U.S. PATENT DOCUMENTS

| | | | |
|---|---|---|---|
| 2007/0146485 A1* | 6/2007 | Horikoshi | 348/173 |
| 2007/0229516 A1 | 10/2007 | Sugimoto | |
| 2008/0204475 A1* | 8/2008 | Kim et al. | 345/660 |
| 2008/0252628 A1 | 10/2008 | Han et al. | |
| 2010/0290667 A1* | 11/2010 | Lienhart et al. | 382/100 |

FOREIGN PATENT DOCUMENTS

| | | |
|---|---|---|
| JP | 2002 511608 | 4/2002 |
| JP | 2003-308041 | 10/2003 |
| JP | 2004-151557 | 5/2004 |
| JP | 2004 356828 | 12/2004 |
| JP | 2006 350173 | 12/2006 |
| JP | 2007 227694 | 9/2007 |
| JP | 2007 251422 | 9/2007 |
| JP | 2008 3590 | 1/2008 |
| JP | 2008 185905 | 8/2008 |
| JP | 2008 209885 | 9/2008 |

OTHER PUBLICATIONS

International Search Report issued Mar. 23, 2010 in PCT/JP09/70675 filed Dec. 10, 2009.

Japanese Office Action issued Jul. 16, 2014 in Japanese Application No. 2013-145763, 4 pages (no English translation).

* cited by examiner

FIG. 7
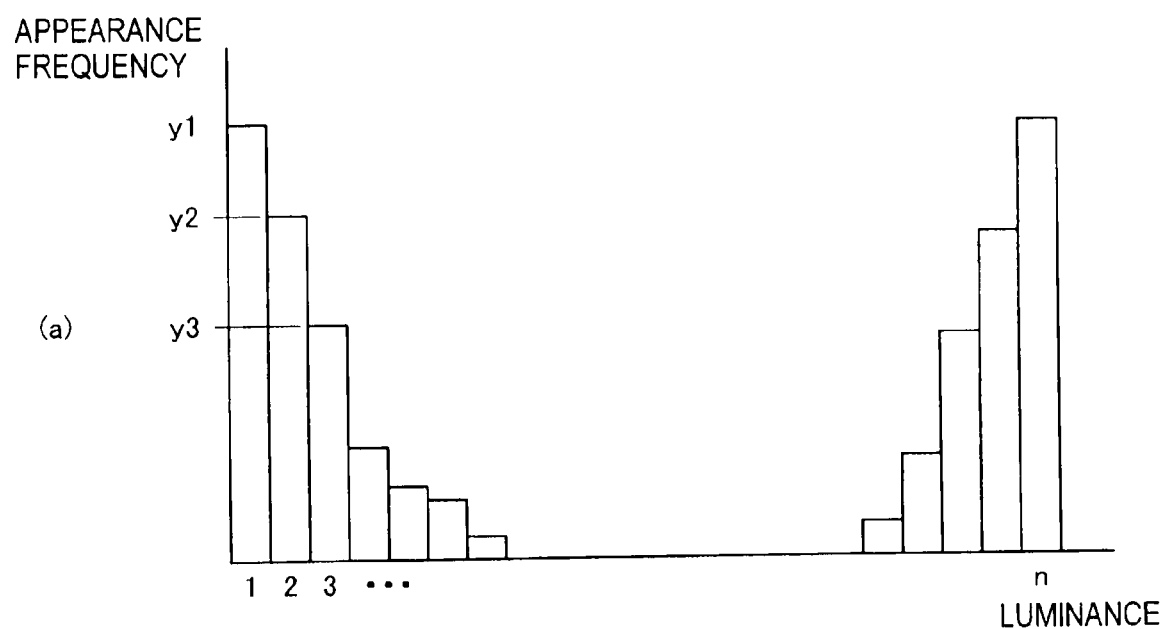
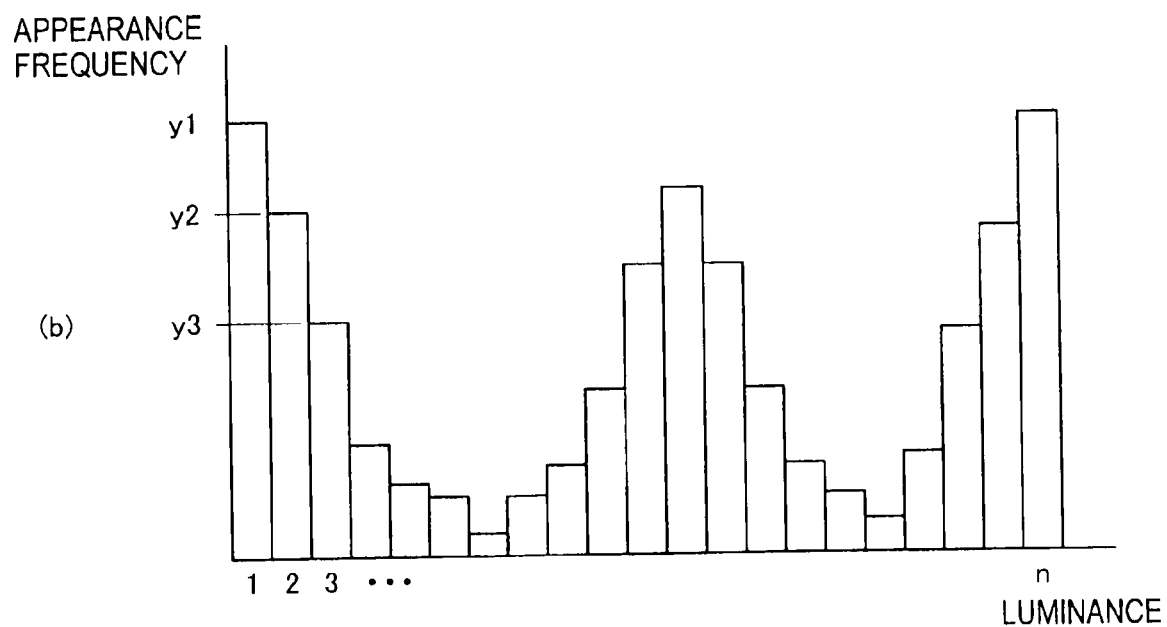

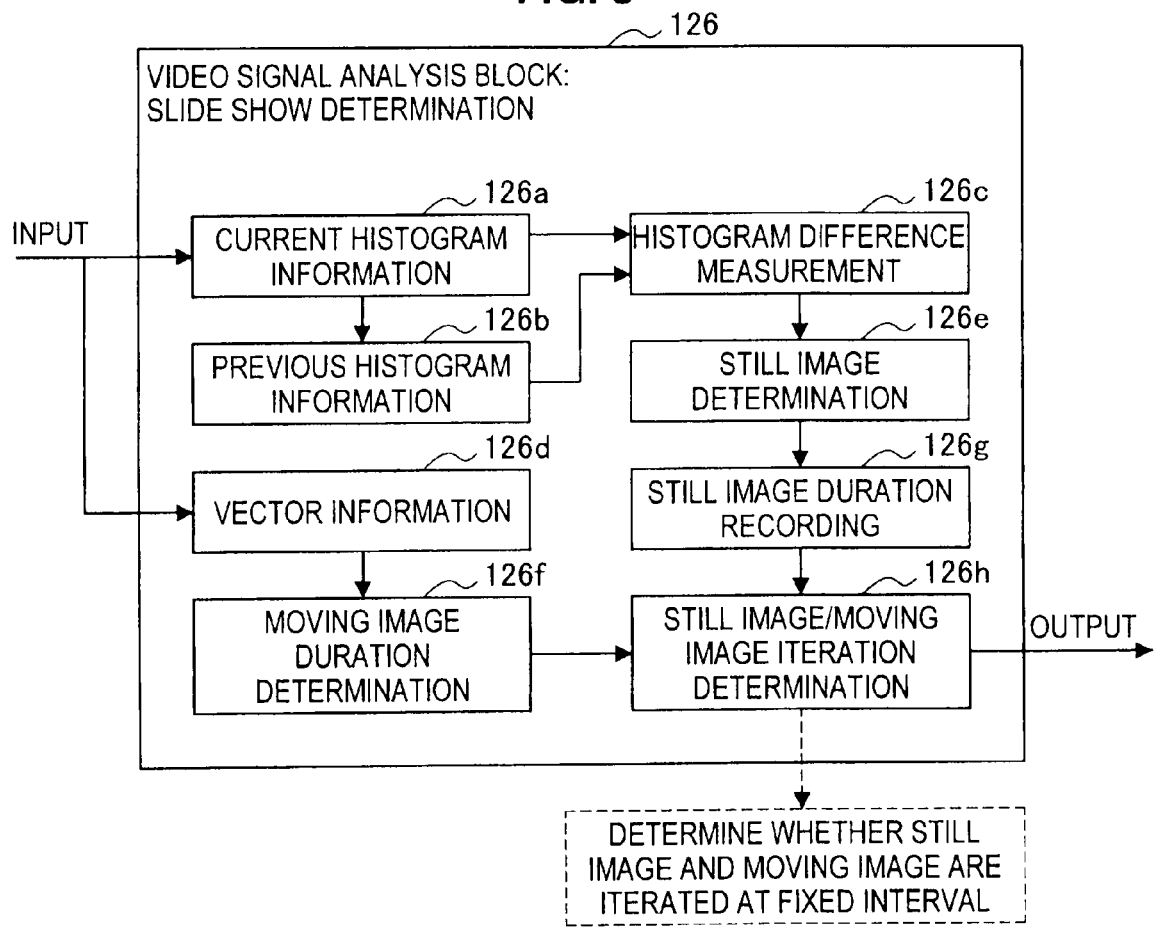
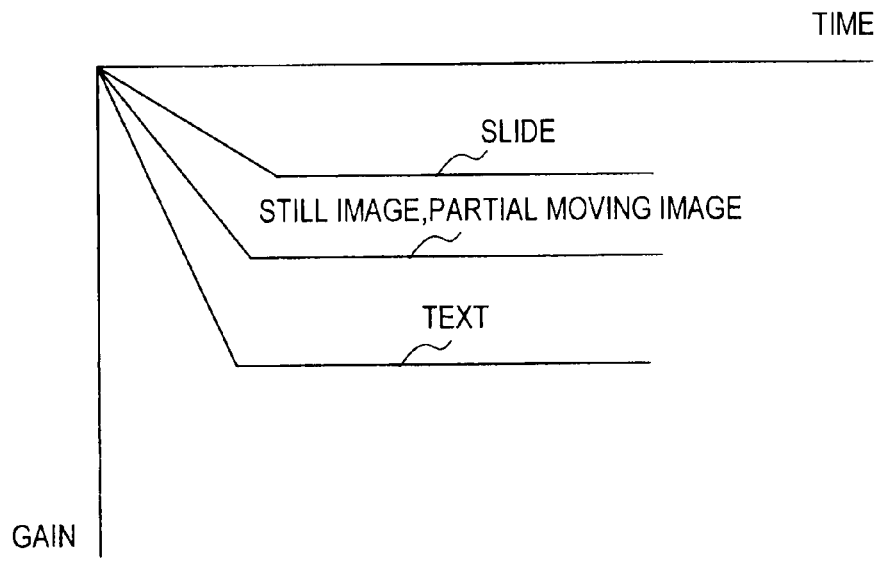

DISPLAY BURN-IN PREVENTION DEVICE AND METHOD WITH MOTION ANALYSIS

TECHNICAL FIELD

The present invention relates to a display device and a method of driving the same.

BACKGROUND ART

In the related art, liquid crystal display (LCD) devices using liquid crystal, plasma display devices using plasma, and the like have been put into practical use as planar thin-type display devices.

The LCD device displays an image by providing a backlight, changing an arrangement of liquid crystal molecules by the application of a voltage, and passing or blocking light from the backlight. In the plasma display device, a plasma state is reached by applying a voltage to gas sealed within a substrate, visible light is obtained by irradiating ultraviolet light generated from energy occurring upon returning from the plasma state to the original state to a fluorescent body, and an image is displayed thereby.

On the other hand, a self light-emitting type display device using an organic electroluminescence (EL) element that emits light itself when a voltage is applied has recently been developed. The organic EL element is changed from a ground state to an excited state when energy is received by electrolysis and emits difference energy as light upon returning from the excited state to the ground state. The organic EL display device displays an image using light emitted by the organic EL element.

The self light-emitting type display device is different from the LCD device in which the backlight is necessary, and can be thinly configured as compared with the LCD device because the backlight is unnecessary due to self light emission of the element. The organic EL display device has attracted attention as a next-generation flat and thin type display device because a moving image characteristic, a viewing angle characteristic, a color reproduction characteristic, and the like are excellent as compared with those of the LCD device.

However, in the organic EL element, a light emission characteristic is deteriorated when a voltage is continuously applied, and luminance is deteriorated even when the same current is input. As a result, if a light emission frequency of a specific pixel is high, there is a problem in that a "burn-in" phenomenon occurs because the light emission characteristic of the specific pixel is deteriorated as compared with those of other pixels.

In terms of the burn-in phenomenon, for example, the following Patent Literature 1 discloses technology assumed to reduce the burn-in while maintaining high display quality regardless of a type of input signal in an image display device corresponding to a plurality of types of input signals.

CITATION LIST

Patent Literature

Patent Literature 1: JP 2007-227694

SUMMARY OF INVENTION

Technical Problem

In a self light-emitting device such as an organic EL device, a burn-in phenomenon occurs according to a type of video to be displayed. For example, because the burn-in occurs easily if a high contrast image such as text (characters) is displayed, it is necessary to reliably prevent the burn-in. On the other hand, because the burn-in occurrence is comparatively difficult if a video is a moving image, it is possible to reduce control for burn-in prevention. In the above-described Patent Literature 1, a technique of switching correction processing according to any one of a PC input signal, a DSC input signal, and a TV signal is described, but correction processing considering a type of video is not assumed. Thus, there is a problem in that the burn-in prevention control may be excessively performed, or that the burn-in prevention processing may be insufficient according to the type of video.

The present invention has been made in view of the above-described problems, and an object of the invention is to provide a novel and improved display device and a method of driving the same that can determine a video on the basis of a video signal and perform optimal control for burn-in prevention.

Solution to Problem

According to an aspect of the present invention in order to achieve the above-mentioned object, there is provided a display device including: a video signal analysis section for analyzing a video signal and determining a type of video from an analysis result; a gain control section for controlling a gain value of the video signal according to the type of video; a video signal adjustment section for adjusting the video signal on the basis of the gain controlled by the gain control section; and a display panel, having a plurality of pixels arranged to self-emit light according to the video signal, for displaying a video on the basis of the video signal adjusted by the video signal adjustment section.

According to the above-described configuration, a video signal is analyzed and a type of video is determined from an analysis result. A gain value of the video signal is controlled according to the type of video, and the video signal is adjusted on the basis of the gain. A video is displayed on the basis of the video signal adjusted by the display panel in which the plurality of pixels are arranged to self-emit light. Accordingly, it is possible to reliably suppress a burn-in phenomenon in a self light-emitting type display panel by controlling the gain value according to the type of video.

The display device may include a histogram generation section for detecting histograms of luminance of the video signals, wherein the video signal analysis section analyzes whether or not the video signal is a signal corresponding to a still image on the basis of a result of comparison of the histograms between a plurality of frames of the video signals.

The display device may include a histogram generation section for detecting histograms representing luminance distributions of the video signals, and a motion vector detection section for detecting a motion vector of a feature point between a plurality of frames, wherein the video signal analysis section analyzes whether or not the video signal is a signal corresponding to a still image, a partial moving image, or a moving image on the basis of a result of comparison of the histograms between the plurality of frames of the video signals and a vector quantity of the motion vector.

The display device may include a histogram generation section for detecting histograms representing luminance distributions of the video signals, wherein the video signal analysis section analyzes whether or not the video signal is a signal corresponding to text information on the basis of a luminance bias of the video signal obtained from the histogram.

The display device may include a histogram generation section for detecting histograms representing luminance distributions of the video signals, and a motion vector detection section for detecting a motion vector of a feature point between a plurality of frames, wherein the video signal analysis section analyzes whether or not the video signal is a signal corresponding to a still image, a partial moving image, or a moving image on the basis of a result of comparison of the histograms between the plurality of frames of the video signals and a vector quantity of the motion vector, and the video signal analysis section includes a still image duration recording section for recording a period of time during which the still image continues, and a determination section for determining whether or not the still image and the moving image are alternately iterated.

According to another aspect of the present invention in order to achieve the above-mentioned object, there is provided a method of driving a display device, including the steps of: analyzing a video signal input to a display panel in each frame and determining a type of video from an analysis result; controlling a gain value of the video signal according to the type of video; and adjusting the video signal on the basis of a gain controlled by the gain control section.

According to the above-described configuration, a video signal input to the display panel in each frame is analyzed and a type of video is determined from an analysis result. A gain value of the video signal is controlled according to the type of video, and the video signal is adjusted on the basis of the gain. Accordingly, it is possible to reliably suppress a burn-in phenomenon in a self light-emitting type display panel by controlling the gain value according to the type of video.

The step of determining the type of video may include: detecting histograms representing luminance distributions of the video signals; and analyzing whether or not the video signal is a signal corresponding to a still image on the basis of a result of comparison of the histograms between a plurality of frames of the video signals.

The step of determining the type of video may include: detecting histograms representing luminance distributions of the video signals, and detecting a motion vector of a feature point between a plurality of frames; and analyzing whether or not the video signal is a signal corresponding to a still image, a partial moving image, or a moving image on the basis of a result of comparison of the histograms between the plurality of frames of the video signals and a vector quantity of the motion vector.

The step of determining the type of video may include: detecting histograms representing luminance distributions of the video signals are detected; and analyzing whether or not the video signal is a signal corresponding to text information on the basis of a luminance bias of the video signal obtained from the histogram.

The step of determining the type of video may include: detecting histograms representing luminance distributions of the video signals, and detecting a motion vector of a feature point between a plurality of frames; analyzing whether or not the video signal is a signal corresponding to a still image or a moving image on the basis of a result of comparison of the histograms between the plurality of frames of the video signals and a vector quantity of the motion vector; and determining whether the video signal is a signal corresponding to a slide show based on a period of time during which the still image continues and whether or not the still image and the moving image are alternately iterated.

Advantageous Effects of Invention

According to the present invention, it is possible to provide a display device and a method of driving the same that can determine a video on the basis of a video signal and perform optimal control for burn-in prevention.

BRIEF DESCRIPTION OF DRAWINGS

FIG. 7 is a schematic diagram showing a technique of determining whether or not a video is text information on the basis of a histogram.

FIG. 8 is a schematic diagram showing a configuration of a slide show determination block.

FIG. 9 is a characteristic diagram showing a gain of a video signal to be controlled by a function control block.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted. Description will be given in the following order.

1. Configuration of Display Device according to Embodiment of Present Invention
2. Configuration of Still Image/Partial Moving Image Determination Block 122
3. Various Information for Setting Video Gain
4. Configuration of Slide show Determination Block
5. Adjustment of Video Signal Gain
6. Method of Driving Display Device

[1. Configuration of Display Device according to Embodiment of Present Invention]

Figure 1:
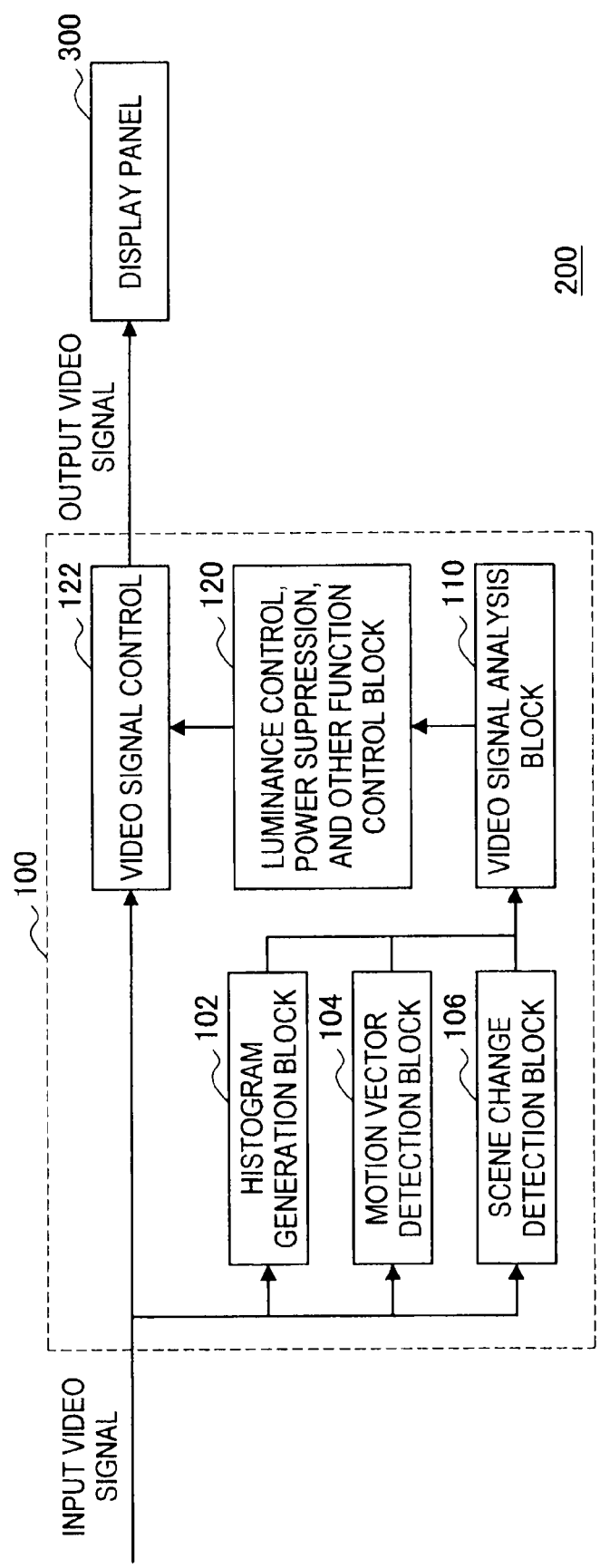
FIG. 1 is a schematic diagram showing a configuration of a display device according to an embodiment of the present invention.

FIG. 1 is a schematic diagram showing a configuration of a display device 200 according to an embodiment of the present invention. The display device 200 is, for example, a device such as a television receiver, and displays a television program or the like on the basis of a video signal obtained from a broadcasting wave. The display device 200 includes a luminance adjustment device 100 and a display panel 300. The video signal is input to the luminance adjustment device 100, subjected to luminance adjustment, and sent to the display panel 300.

In this embodiment, the display panel 300 is constituted by a self light-emitting type of panel. In this embodiment, an organic EL panel is illustrated as the display panel 300. The display panel 300 receives a video signal in which luminance is adjusted, and displays a moving image or a still image by causing the organic EL element, which is an example of a self light-emitting element, to emit light according to an input signal and pulse. In the display panel 300, the shape of a surface on which an image is displayed is flat. The organic EL element is a self light-emitting type of element that emits light when a voltage is applied, and its light emission amount is proportional to the voltage. Accordingly, an IL characteristic (current-light emission amount characteristic) of the organic EL element also has a proportional relationship.

The display panel 300 displays a video on the basis of the adjusted video signal. The display panel 300 is configured that a scan line, which selects a pixel in a predetermined scan cycle, a data line, which provides luminance information for driving a pixel, and a pixel circuit, which controls a current amount on the basis of luminance information and causes the organic EL element, which is a light emitting element, to emit light according to the current amount, are arranged in a matrix. As described above, the scan line, the data line, and the pixel circuit are configured, so that the display panel 300 can display a video according to a video signal.

As shown in FIG. 1, the luminance adjustment device 100 includes a histogram generation block 102, a motion vector detection block 104, a scene change detection block 106, a video signal analysis block 110, a function control block 120, and a video signal control block 122. Each functional block shown in FIG. 1 can be constituted by hardware (a circuit) or an arithmetic processing device (CPU) and software (a program) for causing it to function. If each functional block includes the arithmetic processing device and the software, its program can be stored in a memory provided in the display device 200 or a recording medium such as a memory inserted from the outside. The same is also true for the respective functional blocks of FIGS. 2, 6, and 8.

A video signal is input to the histogram generation block 102, the motion vector detection block 104, and the scene change detection block 106. The histogram generation block 102 generates a histogram representing a relationship between luminance and its appearance frequency from a video signal in each frame. The motion vector detection block 104 extracts a specific feature point from an image in each frame, and detects a motion vector representing a motion of a feature point in each frame. The scene change detection block 106 detects a scene change when a transition from the main story of a program to CM is made. Their histogram, motion vector, and scene change information is sent to the video signal analysis block 120.

The video signal analysis block 120 analyzes and determines a type of video on the basis of the input histogram, motion vector, and scene change information. In more detail, the video signal analysis block 120 analyzes a video signal and determines which of a still image, a moving image, a partial still image, text information, and slide show display corresponds to the video. Thus, the video signal analysis block 120 includes a still image/partial moving image determination block 122, a text image determination block 124, and a slide show determination block 126.

Here, the partial moving image is an image in which a moving image is partially displayed in part of an image of information such as text information. A text information image is an image in which character information is displayed on the entire screen. A slide show image is an image in which a slide of a plurality of still images is sequentially displayed at a predetermined time interval.

[2. Configuration of Still Image/Partial Moving Image Determination Block]

Figure 2:
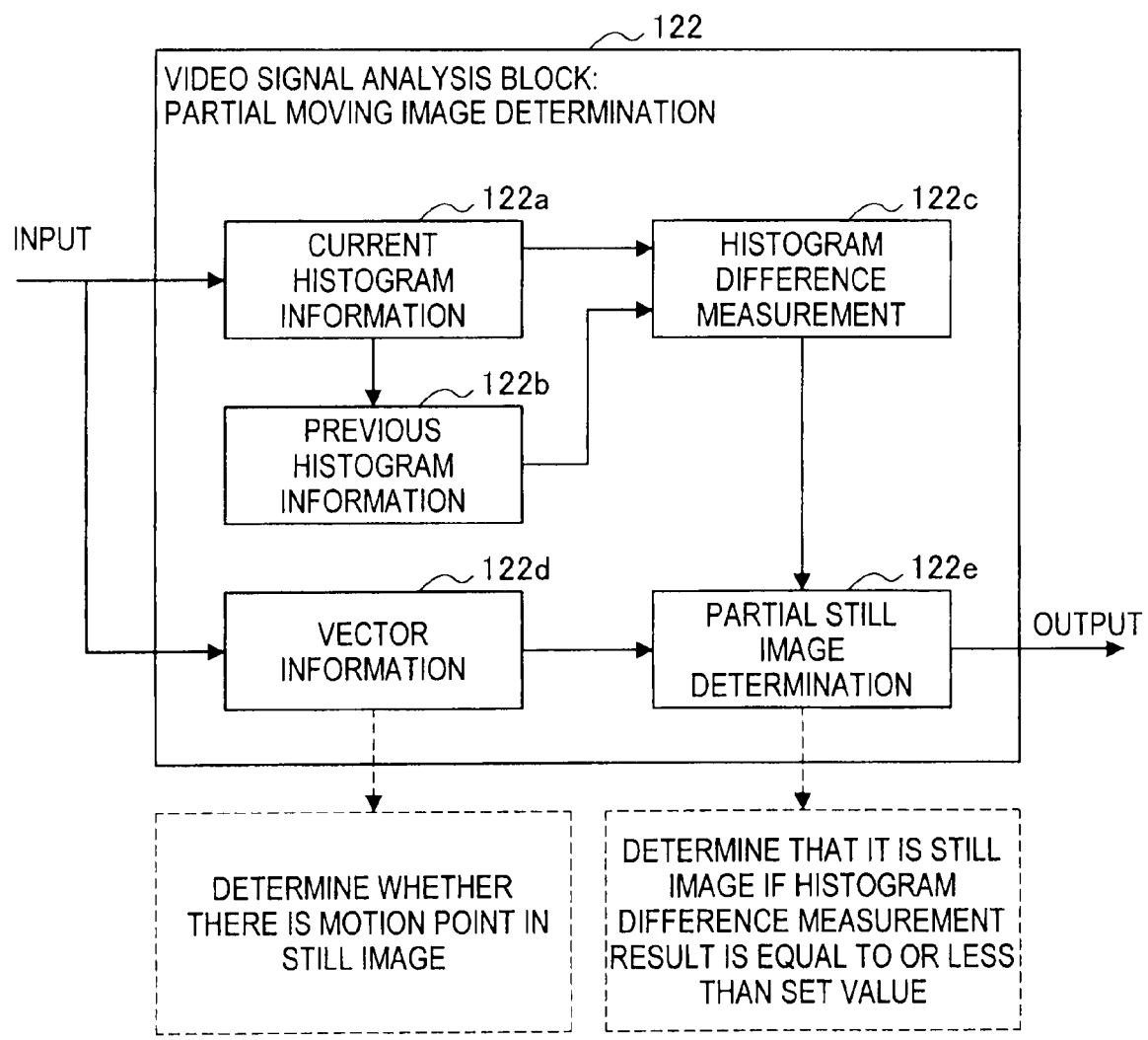
FIG. 2 is a schematic diagram showing a configuration of a still image/partial moving image determination block.

FIG. 2 is a schematic diagram showing a configuration of the still image/partial moving image determination block 122. The still image/partial moving image determination block 122 includes a memory 122a, which retains current histogram information, a memory 122b, which retains previous histogram information, a histogram difference measurement section 122c, a memory 122d, which retains vector information, and a still image determination section 122e.

A histogram generated by the histogram generation block 102 is input to the memory 122a. A histogram previously generated by the histogram generation block 102 is retained in the memory 122a. Here, the histogram stored in the memory 122b is, for example, a histogram of an image before one or several frames, with respect to the histogram of the memory 122a. Information of a motion vector generated by the motion vector detection block 104 is input to the memory 122d.

Figure 3:
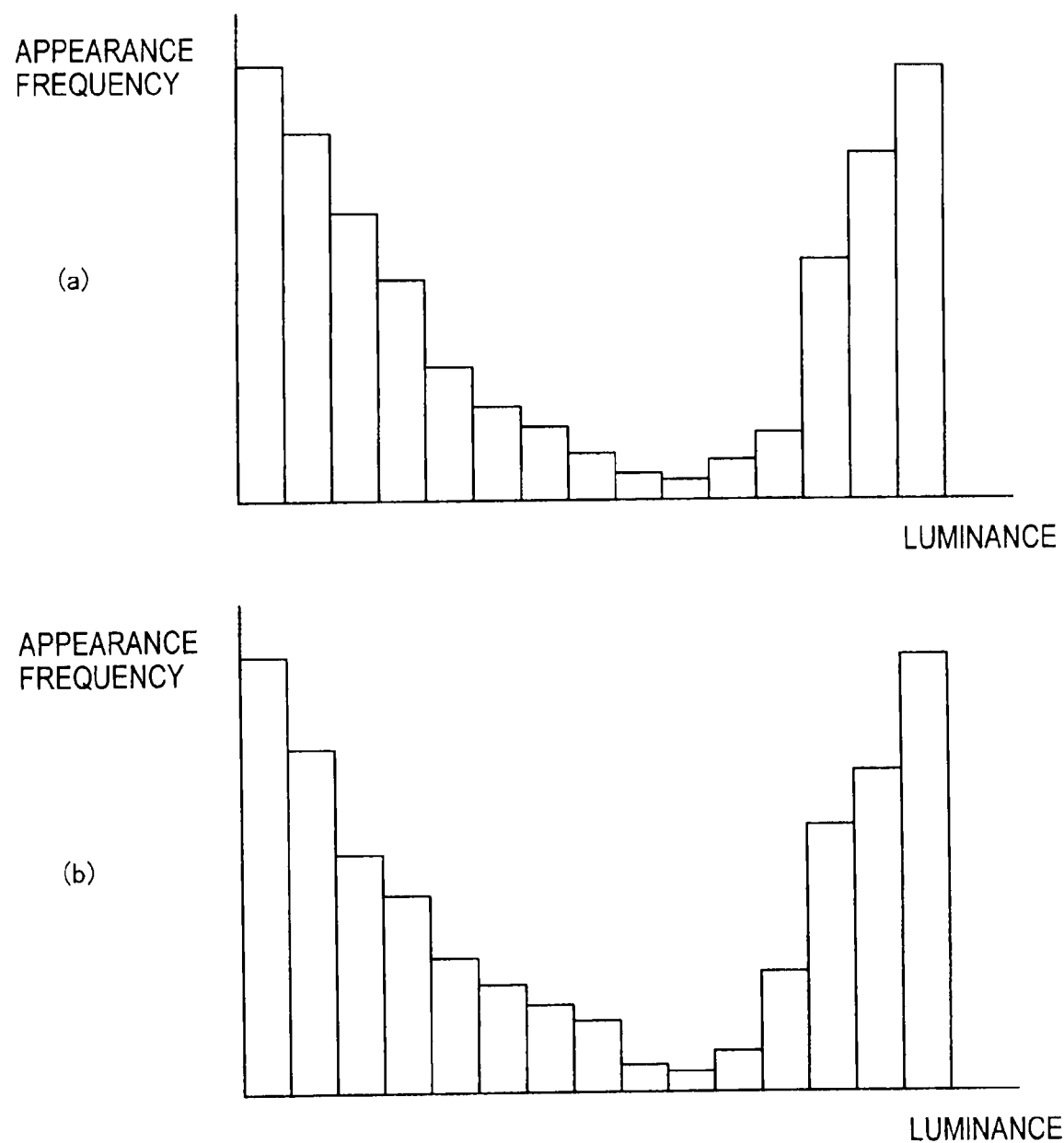
FIG. 3 is a schematic diagram showing a histogram stored in a memory.

FIG. 3 is a schematic diagram showing the histogram, FIG. 3(a) shows the histogram stored in the memory 122a, and FIG. 3(b) shows the histogram stored in the memory 122b. Here, the histogram when a video is a still image is shown. As shown in FIGS. 3(a) and 3(b), because a video signal is basically identical even when one or several frames have elapsed in the case of the still image, the histogram stored in the memory 122a and the histogram stored in the memory 122b have the same characteristic.

Here, sub-pixels of a minimum display unit are arranged in a matrix in the display panel 300. Each sub-pixel corresponds to each color of red (R), green (G), and blue (B). One pixel is constituted by three sub-pixels corresponding to the respective colors.

Accordingly, a display color of each pixel is expressed by a combination of R, G, and B. The luminance of the sub-pixel of each display color is given by sub-pixel data of a video signal.

The luminance of a unit corresponding to each pixel is given by pixel data of a video signal. A histogram calculation is performed for a value calculated from R sub-pixel data, G sub-pixel data, and B sub-pixel data. For example, it is performed for a luminance value of a pixel unit calculated from three sub-pixel data.

If a histogram is generated in a pixel unit, this embodiment can be used in any case where a histogram is generated in a sub-pixel unit. Here, if the histogram is generated in the pixel unit, a corresponding light emission amount is considered in the pixel unit. On the other hand, if the histogram is generated in the sub-pixel unit, a corresponding light emission amount is considered in a pixel unit corresponding to each color.

Hereinafter, a histogram is assumed to be generated in a sub-pixel unit (color unit) so as to avoid repeated description, but it can be equally applied in the case where a histogram is generated in a pixel unit.

The histogram difference measurement section 122c calculates a difference between the histogram stored in the memory 122a and the histogram stored in the memory 122b. As described above, if the video is the still image, the difference becomes 0 because the histogram stored in the memory 122a is the same as the histogram stored in the memory 122b.

The histogram difference calculated by the histogram difference measurement section 122c is sent to the still image determination section 122d. The still image determination section 122d determines whether or not the video is the still image on the basis of the difference.

Figure 4:
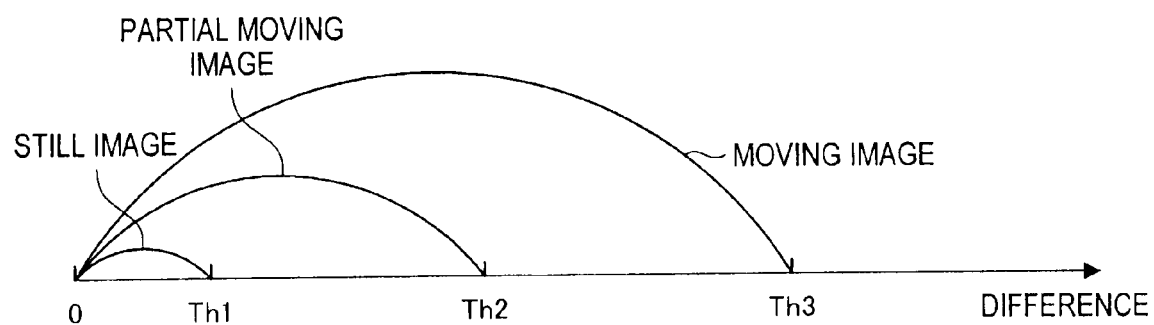
FIG. 4 is a schematic diagram showing a determination performed by a still image determination section on the basis of a histogram difference.

FIG. 4 is a schematic diagram showing an example of a determination to be performed by the still image determination section 122e on the basis of the histogram difference. As shown in FIG. 4, it is determined whether a video is a still image, a partial moving image, or a moving image according to a difference value. Here, three threshold values Th1, Th2, and Th3 are set for the determination.

Figure 5:
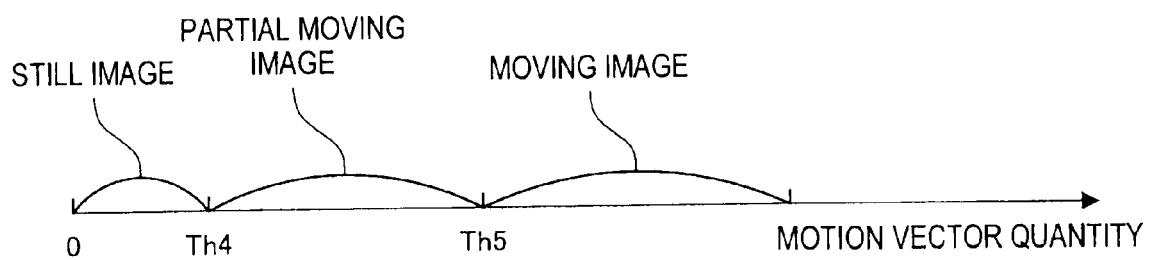
FIG. 5 is a schematic diagram showing a determination performed by the still image determination section on the basis of a motion vector.

FIG. 5 is a schematic diagram showing an example of the determination to be performed by the still image determination section 122e on the basis of a motion vector. As shown in FIG. 5, it is determined whether a video is a still image, a partial moving image, or a moving image according to a motion vector value. Here, three threshold values Th4 and Th5 are set for the determination.

As shown in FIG. 4, if the histogram difference is equal to or less than the threshold value Th1, it is determined that the video is the still image or the partial moving image. In this case, it is determined whether the video is either the still image or the partial moving image by a motion vector. As shown in FIG. 5, if a motion vector value is equal to or less than the threshold value Th4, it is determined that the video is the still image. If the motion vector value is greater than the threshold value Th4, it is determined that the video is the partial moving image.

Next, if the histogram difference is greater than the threshold value Th1 and equal to or less than the threshold value Th2, it is determined that the video is the partial moving image or the moving image. In this case, it is determined whether the video is either the partial moving image or the moving image by a motion vector. As shown in FIG. 5, if a motion vector value is equal to or less than the threshold value Th5, it is determined that the video is the partial moving image. If the motion vector value is greater than the threshold value Th5, it is determined that the video is the moving image.

The still image, the partial moving image, and the moving image are determined using both the histogram difference and the vector information in the above-described example, but the still image determination may be performed on the basis of only the histogram difference. In this case, it may be determined to be the still image if the difference is equal to or less than the threshold value Th1, and it may be determined to be the partial moving image if the difference exceeds the threshold value Th1.

[3. Configuration of Text Image Determination Block]

Figure 6:
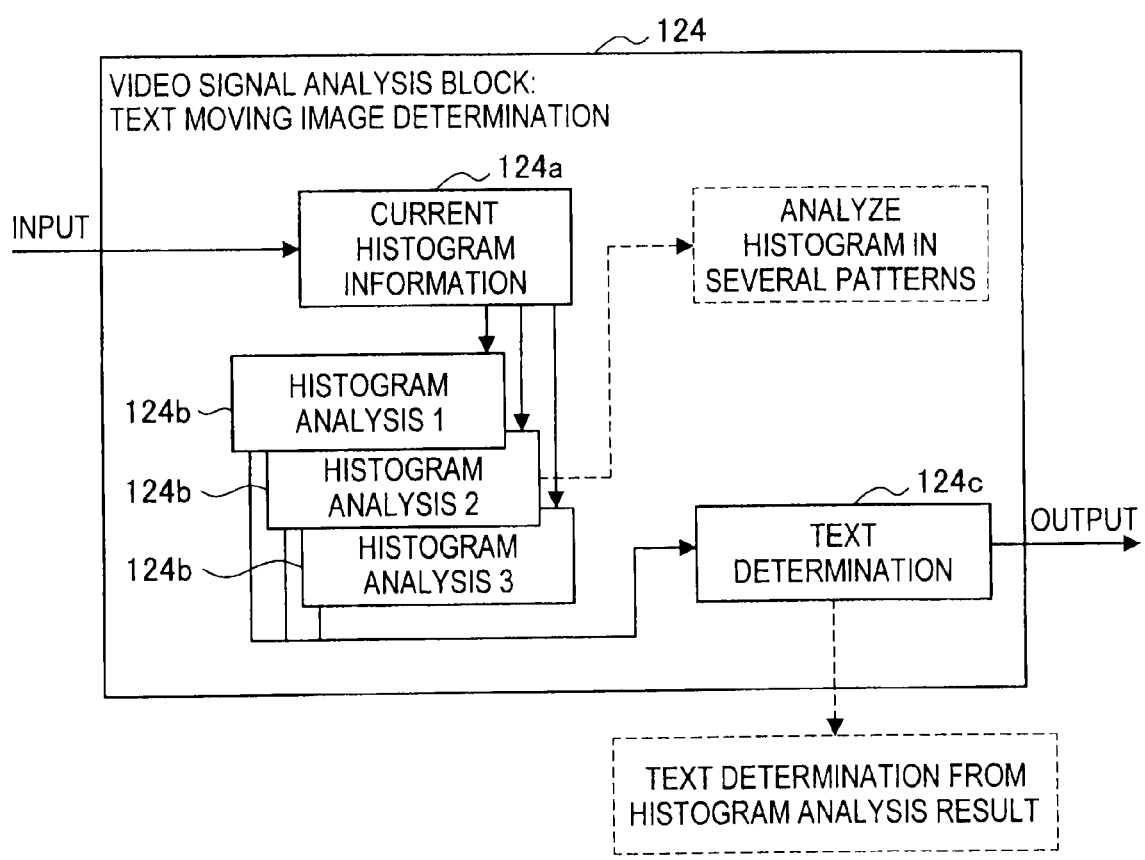
FIG. 6 is a schematic diagram showing a configuration of a text image determination block.

FIG. 6 is a schematic diagram showing a configuration of the text image determination block 124. As shown in FIG. 6, the text image determination block 124 includes a memory 124a, which retains histogram information, a plurality of histogram analysis sections 124b, and a text determination section 124c.

A histogram generated by the histogram generation block 102 is input to the memory 124a. The histogram analysis section 124b analyzes the histogram according to several patterns, and sends an analysis result to the text determination section 124c. The text determination section 124c determines whether or not a video is text information on the basis of the analysis result sent from the histogram analysis section 124b.

FIG. 7 is a schematic diagram showing a technique of determining whether or not a video is text information on the basis of a histogram. If the video is a normal still image or moving image, or the like, a distribution having a high appearance frequency in a high luminance side and a low luminance side is obtained as shown in FIG. 7(a). On the other hand, if the video as shown in FIG. 7(b) is text information, an appearance frequency becomes high in specific luminance (luminance shown in a range d shown in FIG. 7(b)) corresponding to text. Accordingly, it can be determined whether or not the video is the text information according to whether or not there is a bias in a luminance distribution.

In order to determine the presence of a bias of luminance as shown in FIG. 7(b), the histogram analysis section 124b calculates adjacent luminance appearance frequency differences y2−y1, y3−y2, . . . y(n)−y(n−1), and calculates a sum thereof. Also, the histogram analysis section 124b performs division operations between adjacent luminance appearance frequencies (y2/y1, y3/y2, . . . y(n)/y(n−1)), and calculates a sum thereof. A sum of difference results and a sum of division results are sent to the text determination section 124c. Here, the sum of difference results and the sum of division results become large when there is a distribution bias as shown in FIG. 7(b).

If the sum of difference results exceeds a predetermined threshold value and the sum of division results exceeds a predetermined threshold value, the text determination section 124c determines that a video is text information, and outputs a determination result. Thereby, it is possible to determine whether or not the video is the text information.

[4. Configuration of Slide show Determination Block]

FIG. 8 is a schematic diagram showing a configuration of the slide show determination block 126. The slide show determination block 126 includes a memory 126a, which retains current histogram information, a memory 126b, which retains previous histogram information, a histogram difference measurement section 126c, a memory 126d, which retains vector information, and a still image determination section 126e. The slide show determination block 126 includes a still image duration recording section 126f, a moving image duration recording section 126g, and a still image/moving image iteration determination section 126h.

Configurations of the memories 126a and 126b, the histogram difference measurement section 126c, the memory 126d, which retains vector information, and the still image determination section 126e are the same as those of the still image/partial moving image determination block 122. The still image duration recording section 26f records a period of time during which the still image continues. The moving image duration recording section 126g records a period of time during which the moving image continues.

On the basis of still image duration and moving image duration, the still image/moving image iteration determination section 126h determines whether or not the still image is iterated, and determines whether or not the video is a slide show. In more detail, if the still image and the moving image are alternately iterated and durations of individual still images are identical on the basis of the still image duration and the moving image duration, it is determined that the video is the slide show. Thereby, it is possible to determine whether or not the video is the slide show.

[5. Adjustment of Video Signal Gain]

As described above, the luminance adjustment device 100 of this embodiment can determine a type of video by directly determining a video signal. If the video signal analysis block 110 determines the type of video, a determination result is sent to the function control block 120. The function control block 120 calculates parameters that control respective functions of the display device 200 such as video luminance and power consumption. FIG. 9 is a characteristic diagram showing a gain of a video signal to be controlled by the function control block 120. According to the type of video, the function control block 120 changes the gain as shown in FIG. 9.

Specifically, because there is a problem in that burn-in occurs if the video is a video other than a moving image, the gain is controlled to be decreased. Because it is most strict for the burn-in if the video is the text information as shown in FIG. 9, processing of comparatively sharply decreasing the gain is performed immediately after the determination. If the video is the still image or the partial moving image, the gain is slowly decreased as compared with the case of the text information. If the video is the slide show, the gain is more slowly decreased as compared with the case of the still image or the partial moving image. As described above, it is possible to suppress a gain decrease amount for burn-in prevention to a minimum limit by decreasing the gain according to a type of video.

[6. Method of Driving Display Device]

Figure 10:
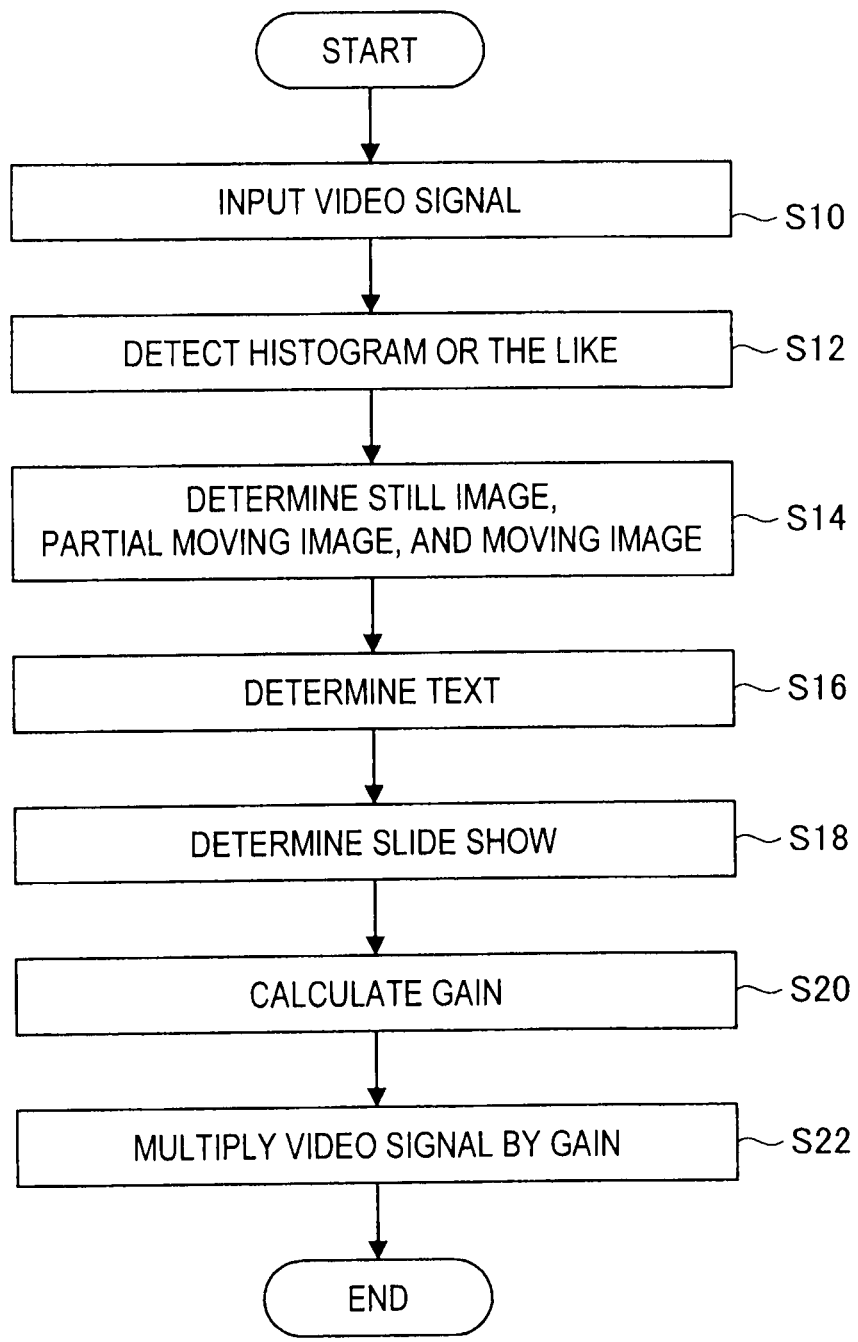
FIG. 10 is a flowchart showing a method of driving the display device.

Next, a method of driving the display device 200 according to an embodiment of the present invention will be described. FIG. 10 is a flowchart showing the method of driving the display device 200 according to the embodiment of the present invention. Hereinafter, the method of driving the display device 200 will be described in detail using FIG. 10.

First, in step S10, the luminance adjustment device 100 acquires a video signal. In the next step S12, a histogram, a motion vector, and a scene change are detected from the video signal.

In the next step S14, the video signal is input to the video signal analysis block 110 and the video signal is analyzed. That is, in step S14, it is determined whether the video signal is a still image, a partial moving image, or a moving image. In the next step S16, it is determined whether or not the video signal is text information. In the next step S18, it is determined whether or not the video signal is a slide show.

In step S20, a gain to be multiplied by the video signal is calculated by the function control block 120 on the basis of a determination result of the video signal. In the next step S22, the gain calculated in step S20 is multiplied by the video signal.

A method of driving the display device 200 according to an embodiment of the present invention has been described above. The method of driving the display device 200 described above may be performed by pre-recording a computer program created to execute the method of driving the display device 100 according to the embodiment of the present invention on a recording medium inside the display device 200 and causing an arithmetic device (for example, CPU or the like) to sequentially read and execute the program.

According to this embodiment as described above, a video signal input to the display panel 300 is analyzed in real time. Thereby, it can be determined whether a currently displayed video is a normal moving image signal, a specific application like a slide show, a video signal including a lot of text data like a data broadcast, or a text-based information screen like teletext. Accordingly, it is possible to provide various triggers for activating a burn-in prevention function according to a type of video in self light-emitting devices including an organic EL display.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, the present invention is widely applicable to a display device to be used in a television receiver, and the like.

REFERENCE SIGNS LIST

110 Video signal analysis block
120 Function control block
122 Video signal control section
200 Display device
300 Display panel

The invention claimed is
1. A display device comprising:
circuitry configured to
determine a type of video data of a video signal as corresponding to a still image, a partial moving image or a moving image based on a generated a motion vector of a feature point between a plurality of frames of the video signal and histograms of each of the plurality of frames of the video signal;
record a duration of a still image if it is identified that the video signal corresponds to a still image;
control a gain value of the video signal according to the type of video data;
adjust the video signal based on the gain value; and
control a display panel to display a video image based on the adjusted video signal.
2. The display device according to claim 1, wherein
the generated histograms correspond to a luminance of each of the plurality of frames of the video signal, and
the circuitry is configured to identify whether the video signal corresponds to a still image based on a comparison of the histograms between the plurality of frames of the video signal.
3. The display device according to claim 1, wherein
the generated histograms represent luminance distributions of the video signal, and
the circuitry is configured to identify whether the video signal corresponds to a still image, a partial moving image, or a moving image based on a result of a comparison of the histograms between the plurality of frames of the video signals and a vector quantity of the motion vector.
4. The display device according to claim 1, wherein
the generated histograms represent luminance distributions of the video signal, and
the circuitry is configured to identify whether the video signal is a signal corresponding to text information based on a luminance bias of the video signal obtained from at least one of the histograms.
5. The display device according to claim 1, wherein
the circuitry is configured to determine whether the video signal includes alternately iterated still and moving images.
6. A method of driving a display device, the method comprising:
determining a type of video data of a video signal as corresponding to a still image, a partial moving image or a moving image based on a generated a motion vector of a feature point between a plurality of frames of the video signal and histograms of each of the plurality of frames of the video signal;
recording a duration of a still image if it is identified that the video signal corresponds to a still image;
controlling a gain value of the video signal according to the type of video data; and
adjusting the video signal based on the gain value.
7. The method according to claim 6, further comprising:
detecting the histograms of the plurality of frames of the video signal, wherein the detected histograms represent luminance distributions of the video signal; and
determine whether the video signal corresponds to a still image based on a result of comparing the histograms between the plurality of frames of the video signal.
8. The method according to claim 6, further comprising:
detecting the histograms of the plurality of frames of the video signal, wherein the detected histograms represent luminance distributions of the video signal;

detecting the motion vector of the feature point between the plurality of frames; and identifying whether the video signal corresponds to a still image, a partial moving image, or a moving image based on a result of comparison of the histograms between the plurality of frames of the video signal and a vector quantity of the motion vector.

9. The method according to claim 6, further comprising:

detecting the histograms of the plurality of frames of the video signal, wherein the detected histograms represent luminance distributions of the video signal; and identifying whether the video signal corresponds to text information based on a luminance bias of the video signal obtained from at least one of the histograms.

10. The method according to claim 6, further comprising:

determining whether the video signal includes alternately iterated still and moving images.

11. An image processing device comprising:

circuitry configured to determine a type of video data of a video signal as corresponding to a still image, a partial moving image or a moving image based on a generated a motion vector of a feature point between a plurality of frames of the video signal and histograms of each of the plurality of frames of the video signal;

record a duration of a still image if it is identified that the video signal corresponds to a still image;

control a gain value of the video signal according to the type of video data; and adjust the video signal based on the gain value; and a display panel configured to display the adjusted video signal.

* * * * *